United States Patent [19]

Sakakibara et al.

[11] Patent Number: 5,215,058
[45] Date of Patent: Jun. 1, 1993

[54] KNOCK CONTROL APPARATUS FOR INTERNAL COMBUSTION ENGINES

[75] Inventors: Koji Sakakibara, Hekinan; Hirohiko Yamada, Anjo, both of Japan

[73] Assignee: Nippondenso Co., Ltd., Kariya, Japan

[21] Appl. No.: 937,954

[22] Filed: Sep. 1, 1992

[30] Foreign Application Priority Data

Sep. 4, 1991 [JP] Japan ................. 3-224265

[51] Int. Cl.⁵ ............................ F01P 5/14
[52] U.S. Cl. ................................ 123/425
[58] Field of Search ............ 123/435, 436; 73/35

[56] References Cited

U.S. PATENT DOCUMENTS

| | | | |
|---|---|---|---|
| 4,617,895 | 10/1986 | Sakakibara et al. | 123/425 |
| 4,770,144 | 9/1988 | Sakakibara et al. | 123/425 |
| 4,854,286 | 8/1989 | Chemnitzer | 123/425 |
| 4,993,387 | 2/1991 | Sakakibara et al. | 123/425 |
| 5,040,510 | 8/1991 | Krebs et al. | 123/425 |
| 5,134,980 | 8/1982 | Sakakibara et al. | 123/425 |

FOREIGN PATENT DOCUMENTS

| | | |
|---|---|---|
| 0346799 | 12/1989 | European Pat. Off. |
| 2230960 | 9/1990 | Japan |
| 2252165 | 7/1992 | United Kingdom |

Primary Examiner—Willis R. Wolfe
Attorney, Agent, or Firm—Cushman, Darby & Cushman

[57] ABSTRACT

The knock control apparatus for an internal combustion engine comprises a knock detecting unit, a knock intensity value detecting unit for detecting a knock intensity value from a knock detecting output signal of the knock detecting unit within a predetermined crank angle range, a unit for calculating a mean value of the knock intensity value, a unit for calculating a mean deviation between the knock intensity value and the mean value, a cumulative percentage point updating unit for updating a cumulative percentage point of the distribution of the knock intensity value, a first updated quantity calculating unit for calculating a first updated quantity based on the knock intensity value and the cumulative percentage point, a second updated quantity setting unit for setting a second updated quantity for updating the cumulative percentage point updating unit based on the magnitude relationship between the first updated quantity and the mean deviation, a knock decision level calculating unit for calculating a knock decision level based on an updation result of the cumulative percentage point updating unit, and a knock decision and control unit for deciding presence or absence of knocking based on a comparison between the knock intensity value and the knock decision level and controlling knock control factors based on a result of the decision, whereby both conditions of the response at the time of a transient operation and the stability during a normal operation, respectively, of the engine are satisfied so that an optimum knock decision level may always be obtained.

4 Claims, 7 Drawing Sheets (TO STEP 400)

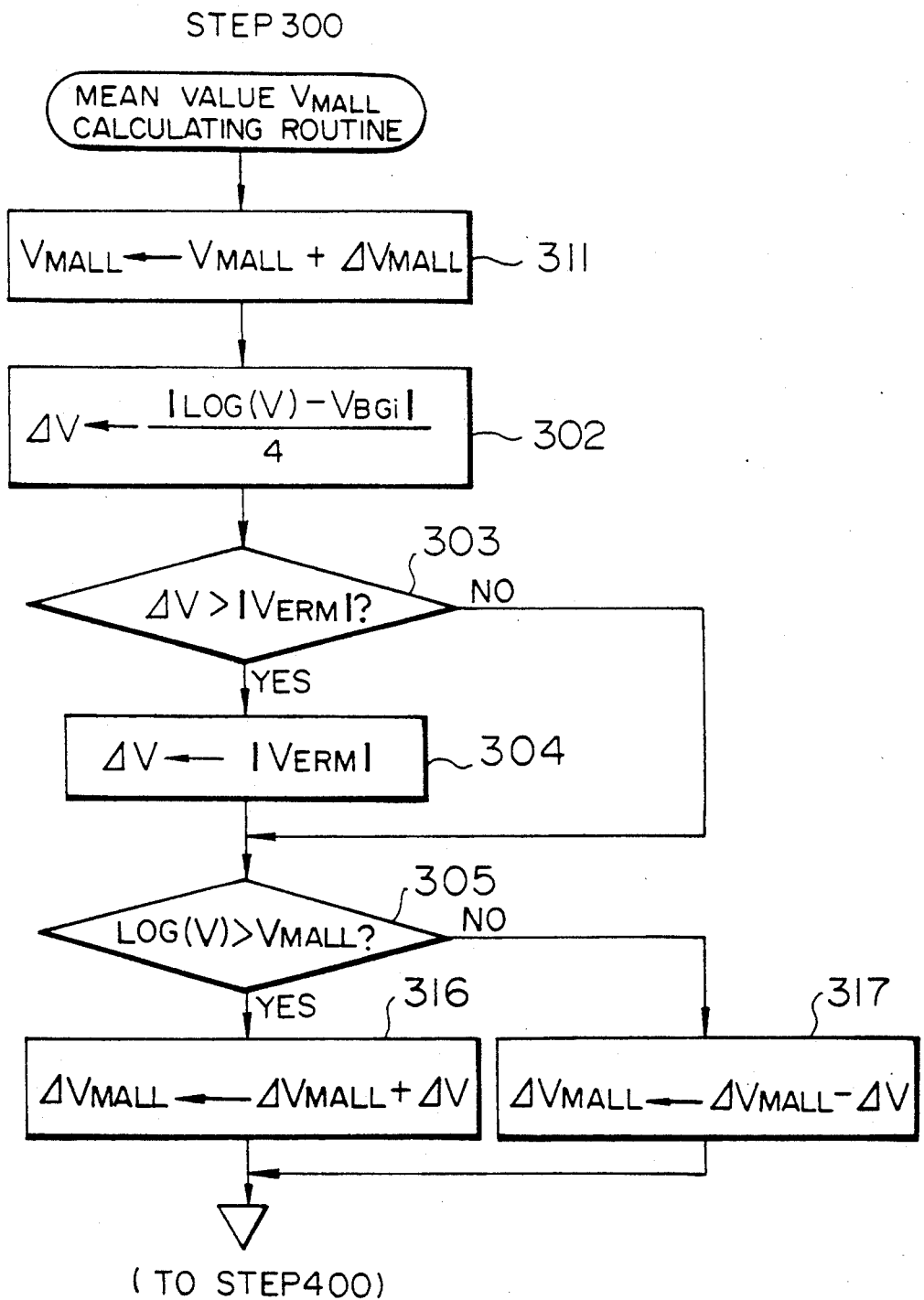

KNOCK CONTROL APPARATUS FOR INTERNAL COMBUSTION ENGINES

BACKGROUND OF THE INVENTION

The present invention relates to what is called a knock control system which detects knocking occurring in an internal combustion engine and controls knocking control factors such as ignition timing and an air-fuel ratio.

A technique for carrying out feedback control is conventionally known, in which feedback control a knock sensor operating as a knock detecting unit for detecting knocking and outputting an electric knocking detection signal is provided in a cylinder block of an internal combustion engine, a knock decision unit decides whether knocking has occurred or not in the internal combustion engine based on an output signal of the knock sensor, and, if the knock decision unit decides that knocking has occurred in the internal combustion engine, ignition timing, for example, is controlled to gradually shift from optimum ignition timing to the retardation side, and, if the knock decision unit decides that knocking has not occurred in the internal combustion engine, the ignition timing is controlled to gradually shift to the optimum ignition timing.

In this case, generally a decision on presence or absence of knocking is made by comparing an output signal of the knock sensor with a knock decision level $V_{KD}$. Therefore, in order to make a knocking decision with high precision, it is important to set the knock decision level $V_{KD}$ to a suitable value.

Thus, the inventors of the present invention have already proposed a system for setting an optimum knock decision level, as disclosed, for example, in JP-A-60-243369 (U.S. Pat. No. 4,617,895). In this proposed system, a knock decision level $V_{KD}$ is calculated by multiplying a center value $V_{BC}$ of the distribution of output signals of a knock sensor by a value K determined according to a rotational speed number of an engine, for example, and the knock decision level $V_{KD}$ is automatically corrected based on the distribution pattern of logarithmic conversion value of the output signal of the knock sensor. More specifically, by using a correction value $\Delta V$ based on the distribution pattern, the knock decision level $V_{KD}$, is corrected to be decreased ($V_{KD} \leftarrow V_{KD} - \Delta V$) or it is corrected to be increased ($V_{KD} \leftarrow V_{KD} + \Delta V$), so that an optimum knock decision level may be set.

However, the setting of the correction value $\Delta V$ is a problem in this case. If the correction value $\Delta V$ is set to a larger value, the response characteristics of the knock decision level $V_{KD}$ (in other words, the followup capability of the knock decision level $V_{KD}$ at a transient time of the internal combustion engine, for example) can be obtained, but the stability of the knock decision level $V_{KD}$, is deteriorated. On the other hand, if the correction value $\Delta V$ is set to a smaller value, the stability of the knock decision level $V_{KD}$ can be obtained, but its response characteristics are deteriorated.

In other words, if the correction value $\Delta V$ is set by laying weight on the stability, there is a risk that an erroneous decision is made that knocking has occurred even when knocking has not occurred, under such a condition that an output signal of the knock sensor has changed suddenly, for example, at the time of an accelerated speed of a vehicle (because the output signal becomes larger at the time of sudden acceleration). On the other hand, if the correction value $\Delta V$ is set by laying weight on the response characteristics, there is a risk that a knocking decision can not be made at last, because a knock decision value is updated greatly under the influence of a noise even in a normal operating state of the engine.

In order to solve the above problems, the inventors of the present invention have proposed an apparatus for detecting a state of an internal combustion engine and increasing the correction value $\Delta V$ thereby to raise the response characteristics during a predetermined time period only in an operating state of the engine where a delay in the response of the knock decision level $V_{KD}$ is a problem, as disclosed in JP-A-1-31564 (U.S. Pat. No. 4,993,387).

However, in the method of calculating the knock decision level $V_{KD}$ by using the above-proposed apparatus, a state of change of a knock sensor signal is assumed based on a state of change of a rotational speed number of the engine. For example, at the time of acceleration of the engine, the correction value $\Delta V$ of the knock decision level $V_{KD}$ is set to a large value based on the fact that a knock sensor signal becomes large under such an accelerating condition, thereby improving the response characteristics. That is, the knock decision level $V_{KD}$ is not updated as a result of detecting a state of change of a knock sensor signal, but the knock decision level $V_{KD}$ is updated indirectly based on a value obtained by the assumption of a state of change of the knock sensor signal from a state of change of a rotational speed number of the engine.

According, it is very difficult to assume at what degree of change of a rotational speed number of the internal combustion engine the knock sensor signal would change greatly, because there arises dispersion in a knock sensor signal at every internal combustion engine. Further, the precision of knock detection will be degraded undesirably when the knock sensor signal per se does not change greatly as assumed, even when the rotational speed number of the engine has changed under a certain travelling condition of a vehicle.

SUMMARY OF THE INVENTION

In order to solve the above problems, it is an object of the present invention to provide an apparatus which accurately detects a state of change of a knock sensor signal, updates the knock decision level $V_{KD}$ with quick response when the knock sensor signal has changed greatly, and sets the knock decision level $V_{KD}$ by laying weight on the stability in order to prevent the knock decision level $V_{KD}$ from being updated greatly under the influence of a noise or the like, when the knock sensor signal is in a stable state, so that the knock decision level $V_{KD}$ can always be updated to have an optimum value.

In order to achieve the above objects of the present invention, the knock control apparatus for an internal combustion engine of the present invention comprises the following constituent elements shown in FIG. 1:

a knock detecting unit for detecting knocking occurring in an internal combustion engine and outputting an electric signal;

a knock intensity value detecting unit for detecting a knock intensity value from the output signal of the knock detecting unit within a predetermined crank angle range;

a mean value calculating unit for calculating a mean value of the knock intensity values;

a mean deviation calculating unit for calculating a mean deviation between the knock intensity value and the mean value;

a cumulative percentage point calculating unit for calculating a cumulative percentage point of the distribution of the knock intensity values;

a cumulative percentage point updating unit including: a first updated quantity calculating unit for calculating a first updated quantity for updating the cumulative percentage point based on the knock intensity value and the cumulative percentage point; and a second updated quantity setting unit for setting a second updated quantity for updating the cumulative percentage point, based on the mean deviation when the first updated quantity is larger than an absolute value of the mean deviation, while, based on the first updated quantity when the first updated quantity is smaller than the absolute value of the mean deviation;

a knock decision level calculating unit for calculating a knock decision level based on an updation result of the cumulative percentage point updating unit; and a knock decision and control unit for deciding presence or absence of knocking based on a comparison between the knock intensity value and the knock decision level and controlling knocking control factors such as ignition timing and an air-to-fuel ratio based on a result of the decision.

Further, the knock control apparatus for an internal combustion engine of the present invention may also comprise the following constituent elements:

a knock detecting unit for detecting knocking occurring in an internal combustion engine and outputting an electric signal;

a knock intensity value detecting unit for detecting a knock intensity value from the output signal of the knock detecting unit within a predetermined crank angle range;

a mean value calculating unit for calculating a mean value of the knock intensity values;

a mean deviation calculating unit for calculating a mean deviation between the knock intensity value and the mean value;

a cumulative percentage point calculating unit for calculating a cumulative percentage point of the distribution of the knock intensity values;

a mean value updating unit including: a first updated quantity calculating unit for calculating a first updated quantity for updating the mean value based on the knock intensity value and the cumulative percentage point; and a second updated quantity setting unit for setting a second updated quantity for updating the mean value, based on the mean deviation when the first updated quantity is larger than an absolute value of the mean deviation, while, based on the first updated quantity when the first updated quantity is smaller than the absolute value of the mean deviation;

a knock decision level calculating unit for calculating a knock decision level based on an updation result of the mean value updating unit; and a knock decision and control unit for deciding presence or absence of knocking based on a comparison between the knock intensity value and the knock decision level and controlling knocking control factors such as ignition timing and an air-to-fuel ratio based on a result of the decision.

According to the present invention, a knock intensity value is detected from the output signal of the knock detecting unit within a predetermined crank angle range, the mean value calculating unit calculates a mean value of the knock intensity value, and the cumulative percentage point updating unit updates a cumulative percentage point of the knock intensity value.

Then, the mean deviation calculating unit obtains a mean deviation between the mean value and the knock intensity value, the first updated quantity calculating unit obtains a first updated quantity for updating the cumulative percentage point based on the knock intensity value and the cumulative percentage point, and the second updated quantity setting unit sets a second updated quantity for updating the cumulative percentage point, based on the first updated quantity when the first updated quantity is smaller than an absolute value of the mean deviation, while, based on the mean deviation when the first updated quantity is larger than the absolute value of the mean deviation. Then, the knock decision level calculating unit calculates a knock decision level based on an updation result of the cumulative percentage point updating unit.

Further, it is also possible to set the second updated quantity for updating the mean value, based on the first updated quantity when the first updated quantity is smaller than an absolute value of the mean deviation, while, based on the mean deviation when the first updated quantity is larger than the absolute value of the mean deviation, and to calculate a knock decision level based on an updation result of the mean value updating unit.

BRIEF DESCRIPTION OF THE DRAWINGS

FIG. 9 shows a flow chart for explaining the operation of a second embodiment of the present invention.

DESCRIPTION OF THE PREFERRED EMBODIMENTS

Embodiments of the present invention will be explained in detail with reference to the accompanying drawings.

Figure 1:
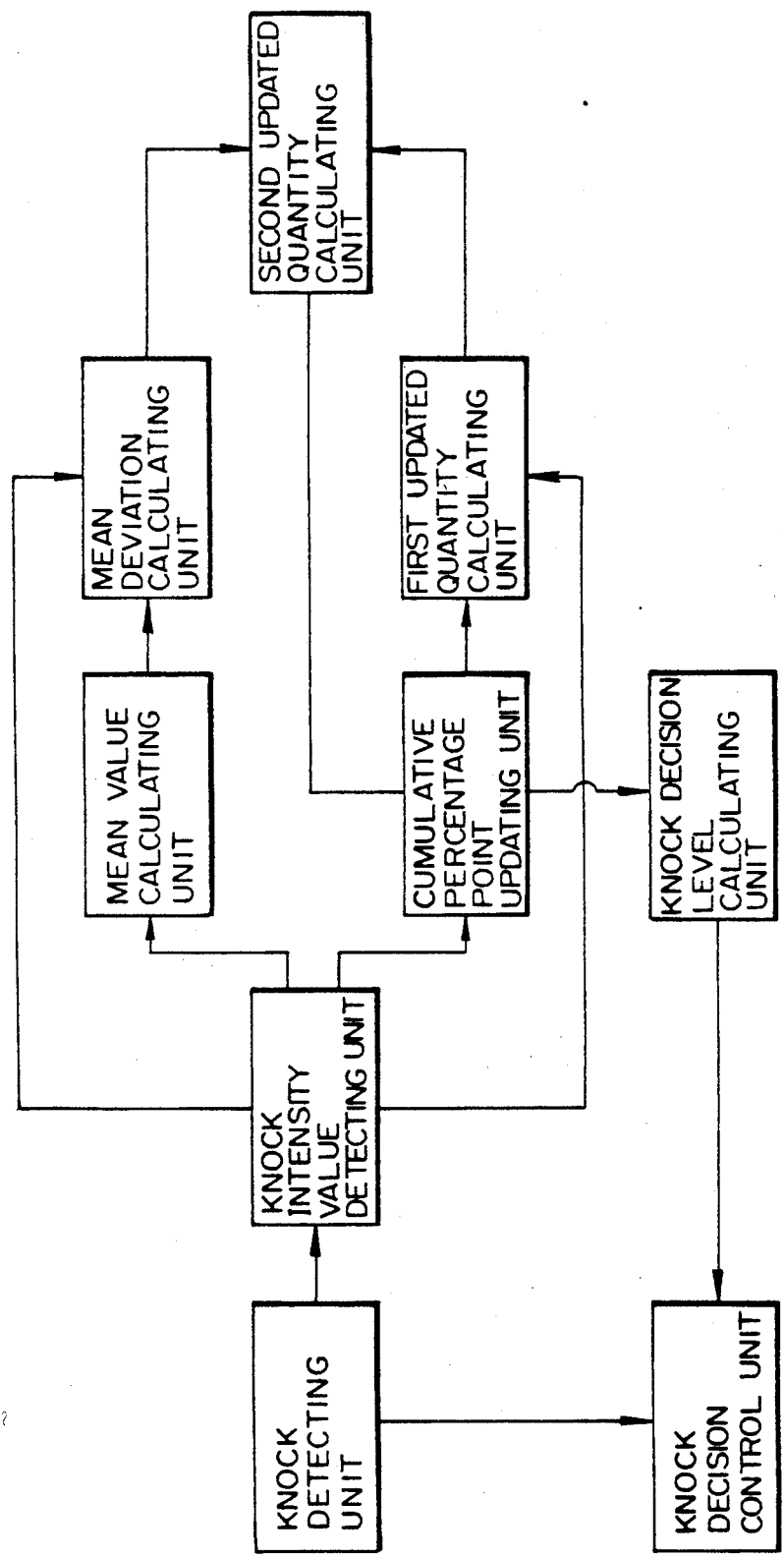
FIG. 1 is a functional block diagram schematically showing the structure of the apparatus of the present invention.

FIG. 1 is a functional block diagram schematically showing mutual relationships between the functions of the constituent elements of the apparatus of the present invention.

Figure 2:
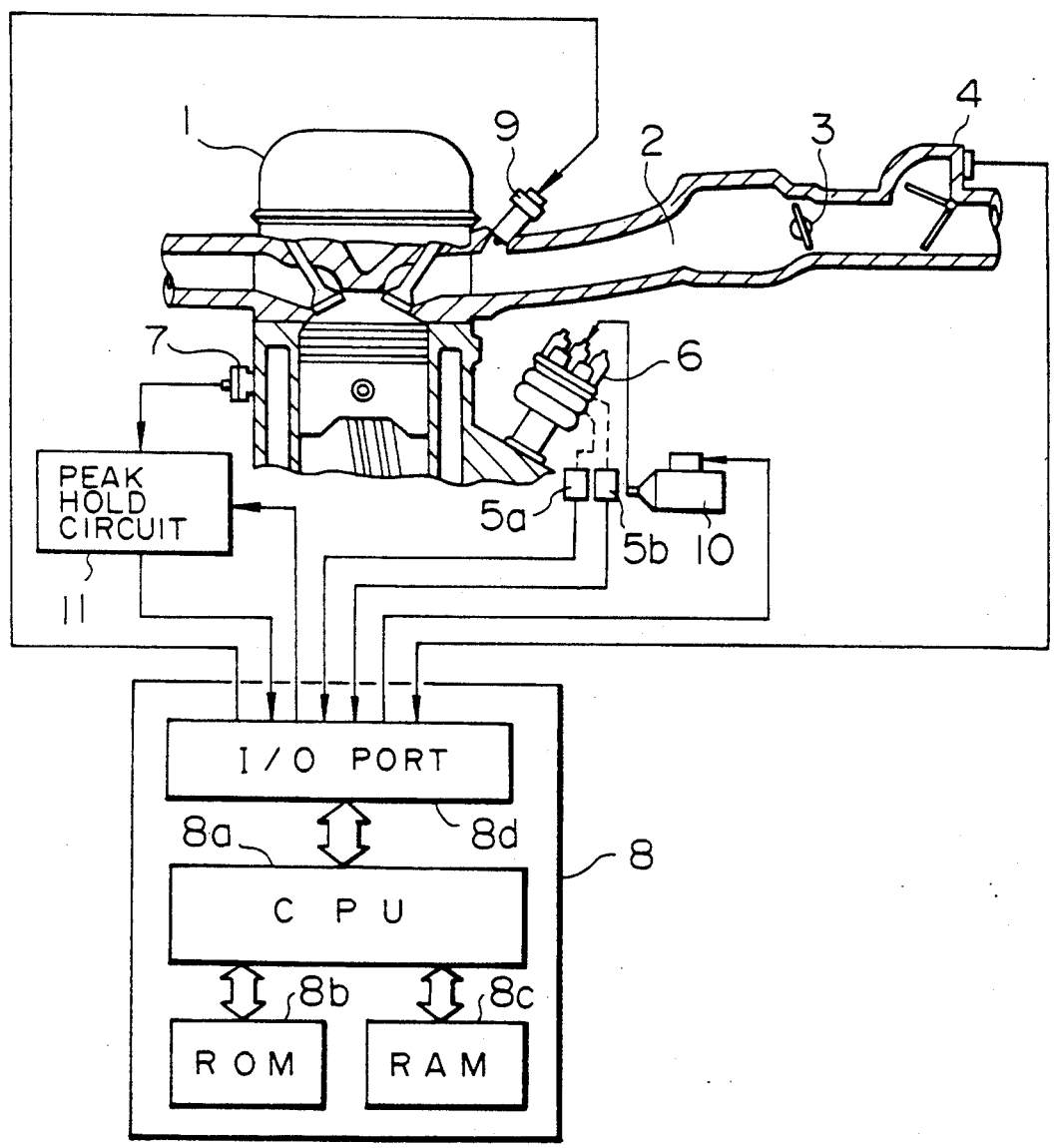
FIG. 2 is a schematic structural diagram showing the configuration of a first embodiment of the present invention.

FIG. 2 is a schematic structural diagram showing the construction of the apparatus of a first embodiment of the present invention.

Referring to FIG. 2, numeral 1 designates an internal combustion engine and numeral 2 designates an intake pipe for introducing intake air from an air cleaner (not shown) into an internal combustion engine. Numeral 3 designates a throttle valve which opens or closes interlinked with the operation of the accelerator pedal (not shown) to control a quantity of intake air (intake air quantity Q) to be introduced into the internal combustion engine. Numeral 4 designates an air flow meter for measuring the intake air quantity Q. The air flow meter 4 has a potentiometer for generating an electric signal indicative of an analog voltage proportional to the intake air quantity Q. This electric signal is inputted to the electronic control unit described later.

Numeral 5a designates a rotational angle sensor contained in a distributor 6 which generates an electric signal used to obtain a rotational speed number Ne of the internal combustion engine 1, said electric signal being generated at predetermined angular intervals. Numeral 5b designates a reference angle sensor contained in the distributor 6 for generating an electric signal showing a reference crank angle position of the internal combustion engine 1 (for example, a top dead center of a cylinder). Both output signals from the rotational angle sensor 5a and the reference angle sensor 5b are applied to the electronic control unit.

Numeral 7 designates a knock sensor which is disposed on a cylinder block of a main body of the internal combustion engine 1 and operates as a knock detecting unit for detecting knocking from the vibration of the cylinder block, for example. An output signal from the knock sensor 7 is inputted to a peak hold circuit 11 described later.

Numeral 8 designates a known electronic control unit (hereinafter referred to as an ECU) which calculates an optimum control quantity for each of the ignition system and the fuel supply system based on a detection signal from each of the sensors described above and the other sensors not shown for detecting a state of the internal combustion engine 1, and outputs a control signal for precisely controlling an injector, an ignitor, etc., as described later.

The ECU 8 comprises a known CPU 8a for carrying out arithmetic processings, a read-only memory unit ROM 8b for storing a control program and control constants necessary for making calculations, a random access memory RAM 8c for temporarily storing arithmetic data during an operation of the CPU 8a, and an I/O port 9d for inputting and outputting signals from the outside of the ECU 8.

The ECU 8 further includes a mean value calculating unit for calculating a mean value of maximum values V (knock intensity values) indicated by signals from the knock sensor 7 within a predetermined crank angle range based on an output signal from the rotational angle sensor 5a, a cumulative percentage point updating unit for updating a cumulative percentage point of the distribution of the knock intensity values V, a knock decision level calculating unit for calculating a knock decision level $V_{KD}$ based on an updation result of the cumulative percentage point updating unit, and a knock decision unit for deciding presence or absence of knocking. The details of the respective units described above will be explained later.

Numeral 9 designates an injector for supplying fuel to the internal combustion engine 1, at optimum timing and with an optimum fuel injection quantity, based on a control signal from the ECU 8, and numeral 10 designates an ignitor for generating a high voltage necessary for causing spark discharge to take place in an ignition plug not shown in the internal combustion engine 1 at optimum timing based on the control signal from the ECU 8.

Numeral 11 designates a peak hold circuit for performing a peak holding operation on output signals of the knock sensors 7 for each engine cylinder. The detailed construction of the peak hold circuit will be explained with reference to FIG. 3.

Figure 3:
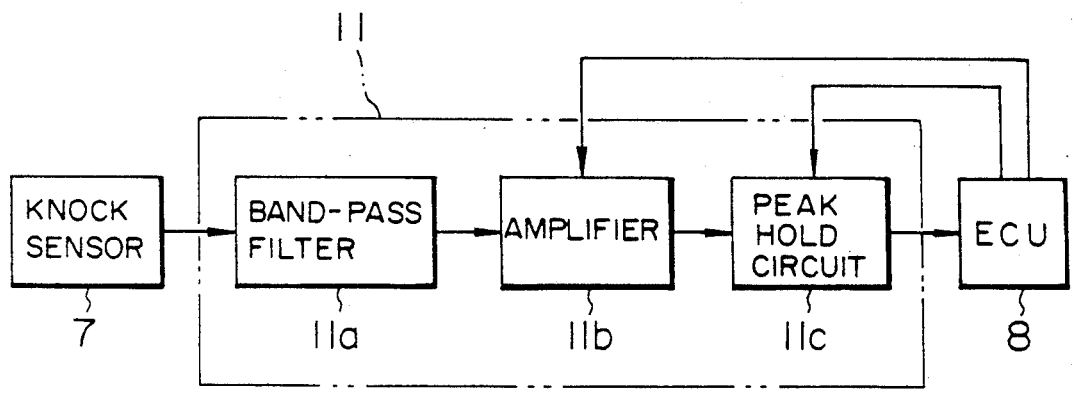
FIG. 3 is a block diagram showing the details of a peak hold circuit shown in FIG. 2.
Figure 4:
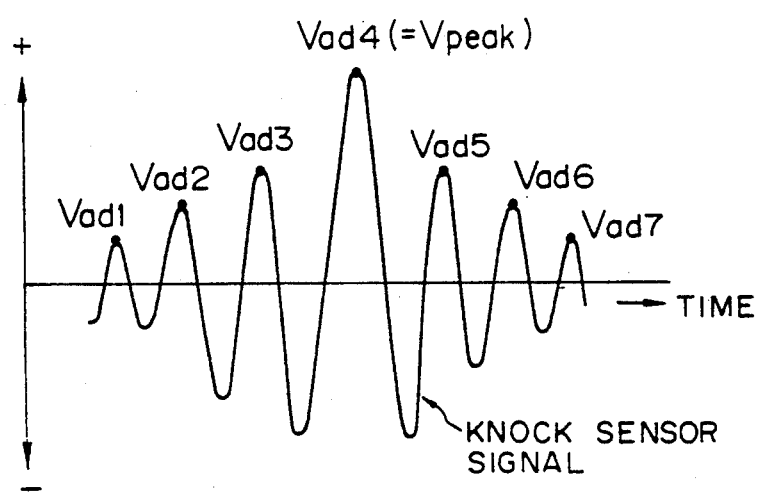
FIG. 4 is a waveform diagram showing the waveform of a knock sensor signal.

Referring to FIG. 3, numeral 11a designates a bandpass filter for eliminating a noise component from the output signals of the knock sensor 7 and extracting only a signal of a specific frequency component generated at the time of occurrence of knocking. Numeral 11b designates an amplifier for amplifying a signal extracted by the band-pass filter 11a always with an optimum amplification factor and based on the signal from the ECU 8. Numeral 11c designates a peak hold circuit forming a knock intensity value detecting unit for outputting a signal representing a knock intensity value obtained by a peak holding operation by the use of a capacitor, for example, a knock sensor signal outputted from the amplifier 11b in accordance with a cylinder change-over signal from the ECU 8. The knock intensity value V in the present embodiment designates a maximum value $V_{peak}$ among maximal values $V_{ADj}$ (j=1, 2 ~ n) of the knock sensor signals within a predetermined crank angle range (for example, an angular range between 10° CA and 70° CA before the upper top dead center) as shown in FIG. 4.

Figure 5:
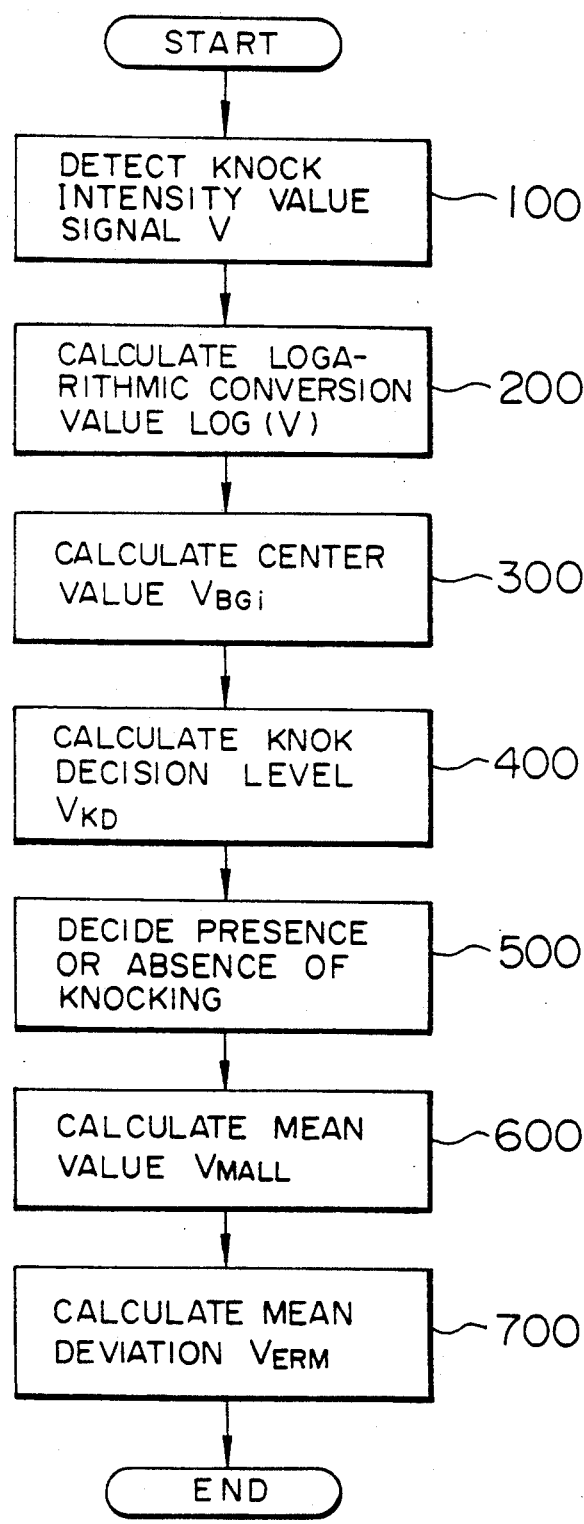
FIG. 5 shows a flow chart for explaining the operation of the present invention.

Next, the processings of knock decision and knock decision level calculation, which are executed in the ECU 8, will be explained with reference to the flow charts shown in FIGS. 5 and 6. The routine shown in FIG. 5 is executed at each predetermined crank angle (at every 70° CA before the upper top dead center in the present embodiment) in synchronism with an interruption angle signal which is set based on information from the rotational angle sensor 5a.

Step 100 detects a signal representing a knock intensity value V outputted from the peak hold circuit 11.

Step 200 calculates a logarithmic conversion value LOG(V) obtained by performing logarithmic conversion of the knock intensity value V in accordance with the following equation (1):

$$LOG(V) = 64/LOG4 \cdot LOG(V/32) \qquad (1)$$

Step 300 obtains an updated center value $V_{BGi}$ of the distribution of the logarithmic conversion value LOG(V) for each cylinder, where i designates a cylinder number, then i=1~4 in case of a four-cylinder internal combustion engine, for example. Since the current processings are the most characteristic part of the present invention, they will be explained later in detail.

Step 400 calculates a knock decision level $V_{KD}$ based on the center value $V_{KD}$ obtained at step 300, by using the following equation (2):

$$V_{KD} \; KVAL + V_{BGi} \qquad (2)$$

where KVAL is a predetermined value determined according to the rotational speed number of the engine and corresponds to a value K which is used in the calculation of the knock decision level $V_{KD}$ in the above-described prior art method. The knock decision level $V_{KD}$ is obtained by the addition of the predetermined value KVAL and the center value $V_{BGi}$. This is because the knock decision level $V_{KD}$ is a logarithmic conversion value. If the knock decision level $V_{KD}$, is in the state prior to the logarithmic conversion, this value is obtained by multiplying the center value $V_{BGi}$ by the predetermined value KVAL.

Step 500 compares the logarithmic conversion value LOG(V) obtained at step 200 with the knock decision value $V_{KD}$, and decides whether knocking has occurred or not in the internal combustion engine 1. To be more specific, a decision is made that knocking has occurred if the logarithmic conversion value LOG(V) is equal to or larger than the knock decision value $V_{KD}$ [LOG(V)$\geq V_{KD}$], while, a decision is made that knocking has not occurred if the logarithmic conversion value LOG(V) is smaller than the knock decision value $V_{KD}$ [LOG(V)$< V_{KD}$].

Step 600 calculates a mean value $V_{MALL}$ of the logarithmic conversion values LOG(V) of all the cylinders by using the following equation (3):

$$V_{MALL} = V_{MALL} + (LOG(V) - V_{MALL})/16 \quad (3)$$

Step 700 calculates a mean deviation $V_{ERM}$ in accordance with the following equation (4) and then the present routine ends:

$$V_{ERM} = V_{ERM} + (LOG(V) - V_{MALL} - V_{ERM})/16 \quad (4)$$

Here, the mean deviation $V_{ERM}$ is a mean value of the deviations between the logarithm conversion values LOG(V) and the mean value $V_{MALL}$.

The mean deviation $V_{ERM}$ is also a characteristic part of the present invention, and therefore a method of calculating the mean deviation $V_{ERM}$ will be explained later in detail.

The processings of step 300 in the routine shown in FIG. 5 will be explained with reference to FIG. 6.

Figure 6:
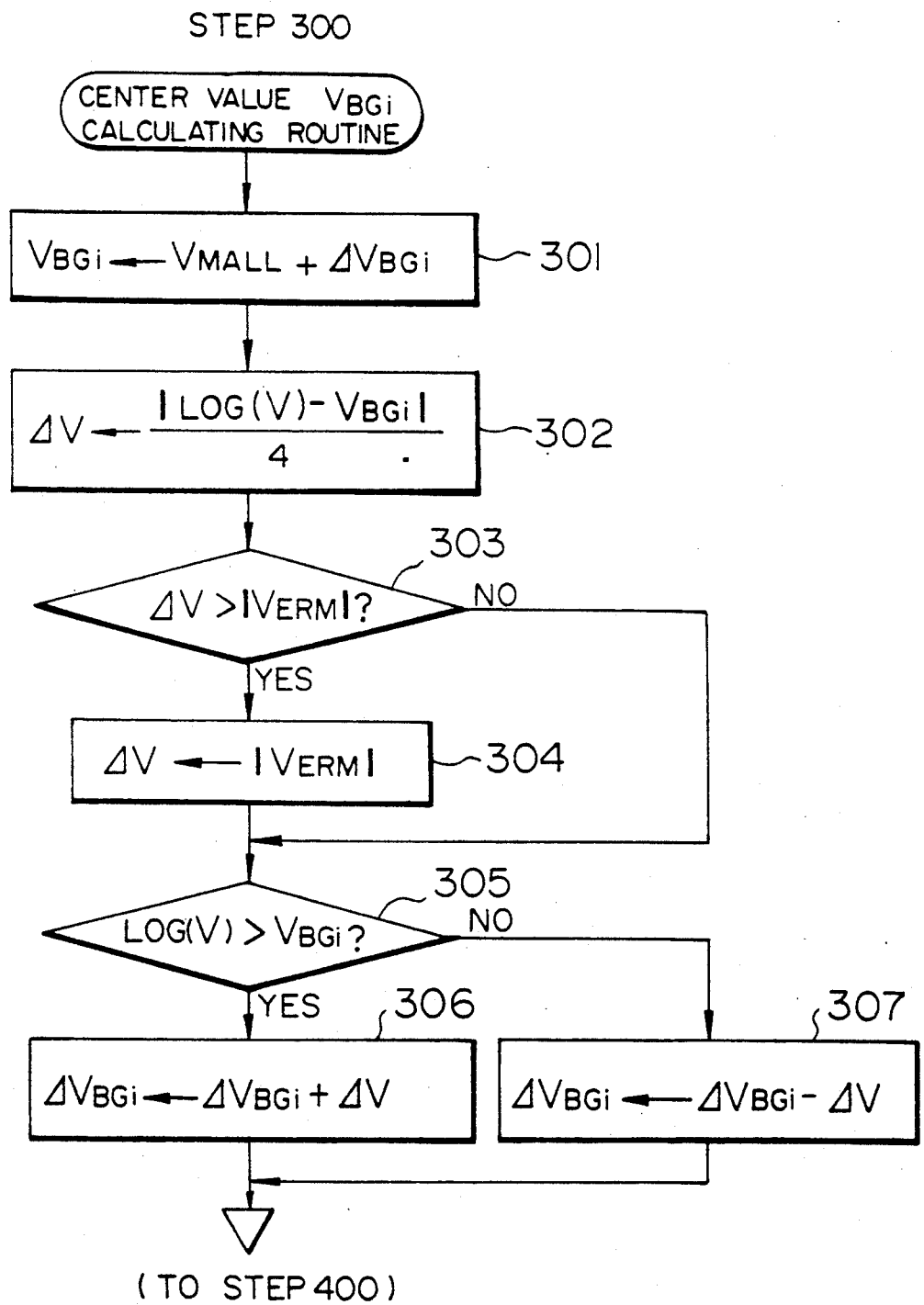
FIG. 6 shows a flow chart for explaining the operation of the present invention.

Referring to FIG. 6, step 301 updates the center value $V_{BGi}$ in accordance with the following equation (5):

$$V_{BGi} = V_{MALL} + \Delta V_{BGi} \quad (5)$$

Here, $\Delta V_{BGi}$ (the second updated quantity) designates a value representing a deviation between the center value $V_{BGi}$ of each cylinder and the mean value $V_{MALL}$ of the logarithmic conversion values LOG(V) of all the cylinders, and $\Delta V_{BGi}$ is obtained by the processings explained later. As a value of $V_{MALL}$, a value calculated previously at step 600 in FIG. 5 is used.

Step 302 calculates an updated quantity $\Delta V$ (the first updated quantity) of $\Delta V_{BGi}$ in accordance with the following equation (6):

$$\Delta V = |LOG(V) - V_{BGi}|/4 \quad (6)$$

Here, as is understood from the equation (6), the updated quantity $\Delta V$ is a value $\frac{1}{4}$ times as many as the absolute value of the deviation between the logarithmic conversion value LOG(V) and the center value $V_{BGi}$ of the cylinder.

Step 303 decides whether the updated quantity $\Delta V$ calculated at step 302 is larger than the above-described absolute value $|V_{ERM}|$ of the mean deviation or not. If the updated quantity $\Delta V$ is larger than the absolute value $|V_{ERM}|$ of the mean deviation, the processings proceed to step 304. Step 304 has the updated quantity $\Delta V$ set to a value of the absolute value $|V_{ERM}|$ of the mean deviation to thereby limit the magnitude of the updated quantity $\Delta V$. On the other hand, if the updated quantity $\Delta V$ is decided to be not larger than the absolute value $|V_{ERM}|$ of the mean deviation at step 303, step 304 is skipped over and the processings proceed to step 305. The above processings will be explained later in detail.

Step 305 decides whether the logarithmic conversion value LOG(V) is larger than the center value $V_{BGi}$ or not. If the logarithmic conversion value LOG(V) is larger than the center value $V_{BGi}$, the processings proceeds to step 306, while, if not, the processings proceeds to step 307.

Step 306 updates $\Delta V_{BGi}$ by using the updated quantity $\Delta V$, which has been set at step 302 or step 304, in accordance with the following equation (7), and then stores the updated $\Delta V_{BGi}$ in RAM 8c so that it may be used at the time when the present routine is executed next time. Thus, the present routine ends, and the processings proceed to the foregoing step 400.

$$\Delta V_{BGi} = \Delta V_{BGi} + \Delta V \quad (7)$$

Step 307 updates $\Delta V_{BGi}$ in accordance with the following equation (8):

$$\Delta V_{BGi} = \Delta V_{BGi} - \Delta V \quad (8)$$

Then, stop 307 stores the updated $\Delta V_{BGi}$ in RAM 8c so that it may be used at the time when the present routine is executed next time, in the same manner as the above-described processings. Thus, the present routine ends, and the processings proceed to the above-described step 400.

Figure 7A:
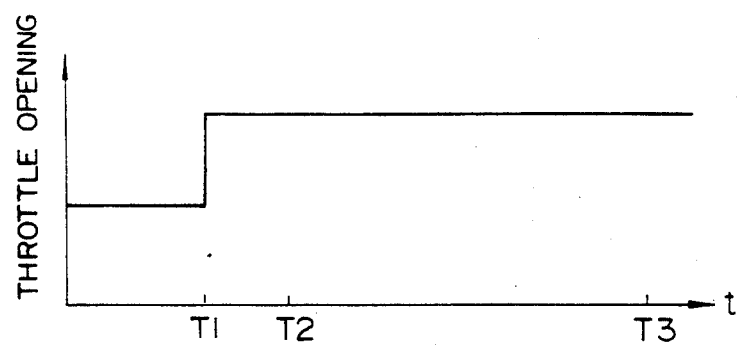
FIGS. 7A and 7B are characteristic diagrams showing the characteristics of the mean deviation $V_{ERM}$ for explaining the processings in the flow chart shown in FIG. 6.
Figure 7B:
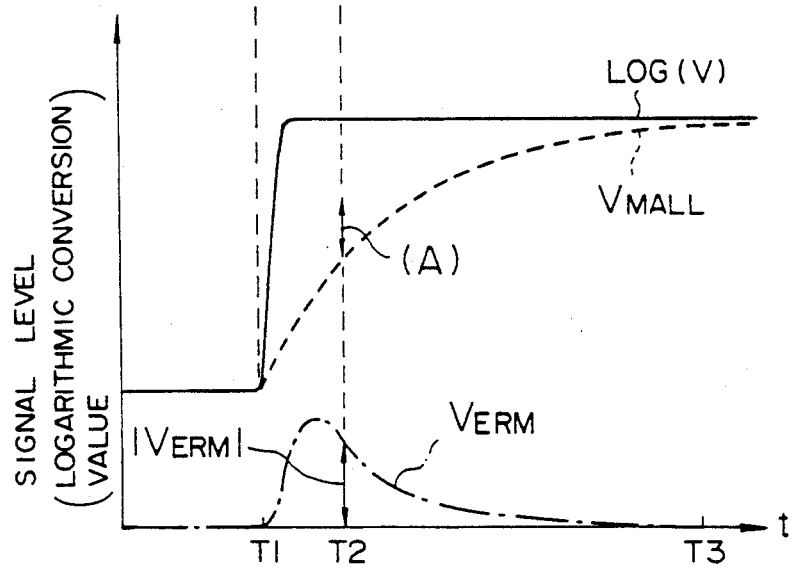

Further, in order to clarify the above-described processings, the processings will be explained in conjunction with the illustrations of FIGS. 7A and 7B. FIGS. 7A and 7B show characteristics of a change with time of the logarithmic conversion value LOG(V) which is obtained by the logarithmic conversion of the knock intensity value V of a certain engine cylinder at the time of acceleration of a travelling vehicle, the mean value $V_{MALL}$ of the logarithmic conversion values LOG(V) for all the cylinders, and the mean deviation $V_{ERM}$. The abscissa in each of FIGS. 7A and 7B indicates time.

Referring to FIG. 7A, at the start of an acceleration state at time $T_1$, the output signal of the knock sensor 7 rises, and the knock intensity value V becomes greater accordingly. Therefore, the logarithmic conversion value LOG(V) also becomes greater as shown by a solid line in FIG. 7B.

A broken line in FIG. 7B indicates the mean value $V_{MALL}$, which also becomes greater as the output signal of the knock sensor 7 rises, because the mean value $V_{MALL}$ is a mean value of the logarithmic conversion value LOG(V).

Since the mean deviation $V_{ERM}$ is a mean value of a deviation between the logarithmic conversion value LOG(V) and the mean value $V_{MALL}$, as shown by the expression (4), the mean deviation $V_{ERM}$ becomes greater as a difference between the logarithmic conversion value LOG(V) and the mean value $V_{MALL}$ increases, as indicated by a one-dot chain line in FIG. 7B.

Each of the processings in the routine shown in FIG. 6 will be explained with reference to FIGS. 7A and 7B.

The updated quantity $\Delta V$ represented by the above equation (6) has a value indicated by (A) at time $T_2$, for example, in FIG. 7B. Therefore, if the processings at step 303 in FIG. 6 is carried out at time $T_2$, and if $\Delta V < |V_{ERM}|$ holds, the updated quantity $\Delta V$ is set to a value of $|\log V - V_{BGi}|/4$. As a result, the center value $V_{BGi}$ is updated with good responsibility, and accordingly the knock decision level $V_{KD}$ is also updated with good responsibility. Thus, it becomes possible to obtain a knock decision level $V_{KD}$ which follows a change of the knock sensor signal with good response characteristic.

On the other hand, at time $T_3$, the output signal of the knock sensor 7 settles down to a certain level, and hence the logarithmic conversion value LOG(V) stays at a fixed level as shown in FIG. 7B. In this state, the mean deviation $V_{ERM}$ assumes a value near zero.

Accordingly, the relation $\Delta V > |V_{ERM}|$ holds at time $T_3$, and the updated quantity $\Delta V$ is set to a value of $|V_{ERM}|$. Thus, the center value $V_{BGi}$ is not updated with a big change and hence the knock decision level $V_{KD}$ can be set stably.

In other words, practically, it is actually the case that there occurs dispersion in the magnitude of output signals of the knock sensor 7. Therefore, if the updated quantity $\Delta V$ is always set to a value of $|\log V - V_{BGi}|/4$, the knock decision level $V_{KD}$ is updated to a new value, in spite that variations in the output signals of the knock sensor 7 are caused actually by the dispersion in the magnitude of the output signals of the knock sensor 7. Thus, such undesirable updation of the knock decision level $V_{KD}$ deteriorates the accuracy of knocking detection. Whereas, when the relation $\Delta V > |V_{ERM}|$ holds, the updated quantity $\Delta V$ is set to a value of $|V_{ERM}|$, as described above. Thus, the known decision level $V_{KD}$ can be set stably, even if there occurs such dispersion as described above.

Accordingly, when the processings shown in FIGS. 5 and 6 are executed, without requiring to detect an operating state of the internal combustion engine 1, it becomes possible to accurately detect a change in the state of the output signals of the knock sensor 7 and to set center value $V_{BGi}$ with good responsibility even when the output signal of the knock sensor 7 has changed suddenly. Further, when the output signal of the knock sensor 7 is in a stable state under a condition such that a vehicle is travelling in a normal way, it is possible to prevent occurrence of such a problem that the center value $V_{BGi}$ changes due to dispersion of the output signals of the knock sensor 7 and to set the center value $V_{BGi}$ stably so that an optimum knock decision level $V_{KD}$ may always be obtained.

Next, the method of calculating the mean deviation $V_{ERM}$ in the present embodiment will be explained. In the present embodiment, step 600 obtains the mean value $V_{MALL}$ of the logarithmic conversion value LOG(V), and calculates the mean deviation $V_{ERM}$ by using this mean value $V_{MALL}$, as shown in the equation (4). The reason therefor is as follows. The absolute value $|V_{ERM}|$ of the mean deviation can have such characteristics that this value is small under a normal vehicle travelling condition, while this value becomes larger during a transient peration time, even when the center value $V_{BG}$ of the logarithmic conversion values LOG(V) for all the cylinders is used instead of the mean value $V_{MALL}$, more specifically, even when the mean deviation $V_{ERM}$ is calculated by using the following equation (9):

$$V_{ERM} = V_{ERM} + (LOG(V) - V_{BG} - V_{ERM})/16 \quad (9)$$

However, when the mean deviation $V_{ERM}$ is calculated in accordance with the above equation (9), the value of the mean deviation $V_{ERM}$ becomes large at the time of frequent occurrence of knocking even under a normal vehicle travelling condition, and the center value $V_{BGi}$ is updated with a large change, as shown by the routine in FIG. 5, with a result that the knock decision level $V_{KD}$ becomes large. As a result, there arises such a problem that a decision that there is no knocking is made, despite that knocking is occurring actually.

Figure 8:
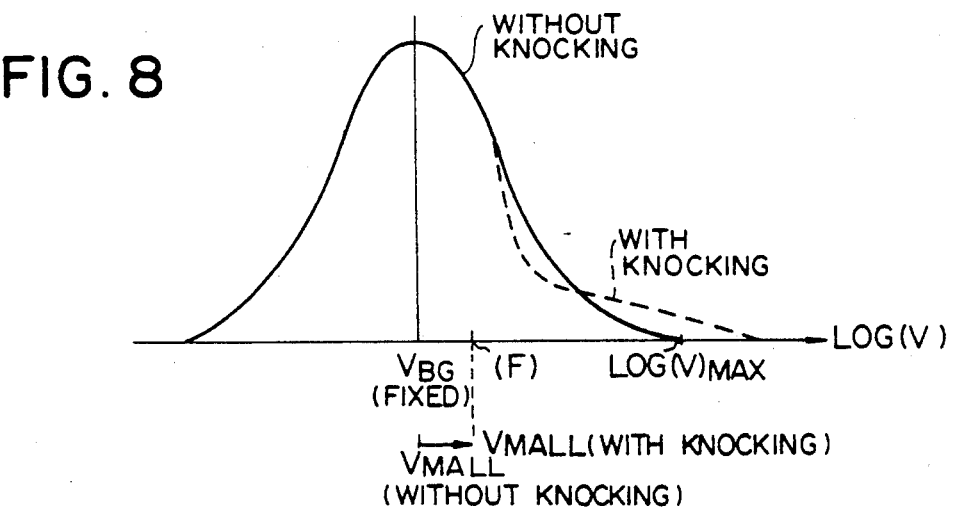
FIG. 8 is a characteristic diagram showing the distribution of a logarithmic conversion value LOG (V)

The above situation is explained in further detail with reference to FIG. 8. FIG. 8 shows a distribution pattern of the logarithmic conversion values LOG(V). When there is no occurrence of knocking, the distribution pattern takes a form corresponding substantially to a normal distribution, as shown by a solid line in FIG. 8, and, when knocking occurs, the distribution pattern takes a form as shown by a broken line. (This is known from the disclosure of JP-A-60-243369, for example).

In this case, it is so defined that the center value $V_{BG}$ takes a value which satisfies a condition such that the probability of holding of $LOG(V) > V_{BG}$ is equal to the probability of holding of $LOG(V) < V_{BG}$. Therefore, the position of the center value $V_{BG}$ in the distribution pattern does not change depending on presence or absence of knocking, as shown in FIG. 8. However, the mean value $V_{MALL}$ changes depending on a state of occurrence of knocking. (When knocking occurs frequently, the maximum value $LOG(V)_{MAX}$ of the logarithmic conversion value LOG(V) is increased.) Accordingly, when knocking occurs, the mean value $V_{MALL}$ becomes larger, and the position of the mean value $V_{MALL}$ moves to a position indicated by (F) in FIG. 8.

When the mean deviation $V_{ERM}$ is defined to be a mean value of the deviation between the logarithmic conversion value LOG(V) and the center value $V_{BG}$, the mean deviation $V_{ERM}$ gradually becomes larger, because the center value $V_{BG}$ always remains fixed even when the logarithmic conversion value LOG(V) becomes larger at the time of frequent occurrence of knocking even under a normal vehicle travelling condition, as described before. Therefore, the relation $\Delta V < |V_{ERM}|$ becomes satisfied, and hence the knock decision level $V_{KD}$ is updated in the direction which renders detection of knocking difficult. Whereas, if the mean deviation $V_{ERM}$ is defined to be a mean value of the deviation between the logarithmic conversion value LOG(V) and the mean value $V_{MALL}$, the mean value $V_{MALL}$ itself becomes larger at the time of frequent occurrence of knocking even under a normal vehicle travelling condition. Therefore, the mean deviation $V_{ERM}$ is kept to have a value nearly around zero, and the knock decision level $V_{KD}$ can be stably. Therefore, there arises no problem such that the knock decision level $V_{KD}$ is updated in the direction which renders detection of knocking difficult.

Thus, for the reasons described above, it is possible to make a decision on the occurrence of knocking with elevated precision by virtue of obtaining the mean deviation $V_{ERM}$ on the basis of the logarithmic conversion value LOG(V) and the mean value $V_{MALL}$.

Further, in the present embodiment, though the knock decision level $V_{KD}$ has been calculated by obtaining the center value $V_{BGi}$ for each cylinder and by using this center value $V_{BGi}$, as shown in FIG. 5, it is also possible to implement the present invention by using the mean value $V_{MALL}$ of the knock sensor signal for each cylinder in place of the center value $V_{BGi}$.

FIG. 9 shows a flow chart for explaining a method of calculating the mean value $V_{MALL}$ in the instant case. Steps for executing the same processings as those contained in the routine of FIG. 6 are designated with the corresponding identical step numbers, and an explanation of the details of processings executed in the respective steps will be omitted to avoid repeated descriptions of the similar contents of processings.

Step 311 updates the mean value $V_{MALL}$ by using the following equation (10):

$$V_{MALL} = V_{MALL} + \Delta V_{MALL} \quad (10)$$

where $\Delta V_{MALL}$ is a value corresponding to $\Delta V_{BGi}$ explained before.

Steps 302 to 305 set the updated quantity $\Delta V$ (the first updated quantity) of $\Delta V_{MALL}$ in accordance with the method described already.

Then, step 316 updates $\Delta V_{MALL}$ by using the following equation (11), and step 317 updates $\Delta V_{MALL}$ by using the following equation (12).

$$\Delta V_{MALL} = \Delta V_{MALL} + \Delta V \quad (11)$$

$$\Delta V_{MALL} = \Delta V_{MALL} - \Delta V \quad (12)$$

Next, by using the mean value $V_{MALL}$ set as described above, the knock decision level $V_{KD}$ is obtained in accordance with the following equation (13):

$$V_{KD} = KVAL + V_{MALL} \quad (13)$$

However, when obtaining the knock decision level $V_{KD}$ by using the mean value $V_{MALL}$ of the knock sensor signal for each cylinder in place of the center value $V_{BGi}$ of the distribution of the logarithmic conversion value LOG(V) for each cylinder, there exists the following problem, as compared with the case where the knock decision level $V_{KD}$ is calculated based on the center value $V_{BGi}$.

That is, as shown in FIG. 8, the value of the mean value $V_{MALL}$ changes depending on presence or absence of knocking. To be more specific, the value of the mean value $V_{MALL}$ increases when knocking occurs. If the mean value $V_{MALL}$ becomes larger, the knock decision level $V_{KD}$ becomes larger accordingly. As a result, it would be finally the case that a decision is made that there is no occurrence of knocking in spite that knocking has occurred actually. While, the value of the center value $V_{BGi}$ does not change depending on presence or absence of knocking, as described above, and therefore the knock decision level $V_{KD}$ is not updated to assume a large value.

Thus, for the reason described above, in the present embodiment, the knock decision level $V_{KD}$ is calculated by using the center value $V_{BGi}$. However, if such deterioration of the accuracy of knocking detection could be tolerated, it is also possible to calculate the knock decision level $V_{KD}$ by using the mean value $V_{MALL}$.

Besides, the present embodiment has used the center value $V_{BGi}$, or more specifically, the value of the cumulative 50 percent point in calculating the knock decision level $V_{KD}$ (the cumulative 50 percent point value is a value at which the probability of holding of the relation of LOG(V) > $V_{BG}$ is equal to the probability of holding of the relation of LOG(V) < $V_{BG}$). However, it is also possible to calculate an optimum knock decision level $V_{KD}$ by using a value corresponding to the cumulative 33 percent point, for example, in the execution of the above-described processings, in place of the center value $V_{BGi}$.

Further, in the present invention, the knock intensity value V has been defined as a maximum value of the knock sensor signal within a predetermined crank angle range, as shown in FIG. 4. However, the knock intensity value V may be defined as a cumulative value ($\Sigma$Vadi) of the maximal values Vadi (i=1~n) of the knock sensor signal as shown in FIG. 4.

As described above, in the present invention, a knock decision level is not calculated based on the assumption of a change of the knock sensor signal from a state of an internal combustion engine, but a state of change of the knock sensor signal is detected accurately by calculating a mean deviation between a knock intensity value and a mean value of the knock intensity value. Thus, when the knock sensor signal has changed greatly, the knock decision level $V_{KD}$ can be updated with high responsibility, and, when the knock sensor signal is in a stable state, the knock decision level $V_{KD}$ can be set by placing importance on the stability so as to prevent the knock decision level $V_{KD}$ from being updated greatly due to the influence of noise, etc. Thus, it is possible to obtain an excellent meritorious effect that the knock decision level $V_{KD}$ can always be set to have an optimum value.

We claim:

1. A knock control apparatus for an internal combustion engine, comprising:

means for detecting knocking occurring in an internal combustion engine and outputting an electric signal;

means for detecting a knock intensity value from the output signal of said knock detecting means within a predetermined crank angle range;

means for calculating a mean value of the knock intensity values;

means for calculating a mean deviation between the knock intensity value and the mean value;

means for calculating a cumulative percentage point of the distribution of the knock intensity values;

cumulative percentage point updating means including:

means for calculating a first updated quantity for updating the cumulative percentage point based on the knock intensity value and the cumulative percentage point; and means for setting a second updated quantity for updating the cumulative percentage point, based on the mean deviation when the first updated quantity in larger than an absolute value of the mean deviation, while, based on the first updated quantity when the first updated quantity is smaller than the absolute value of the mean deviation;

means for calculating a knock decision level based on an updation result of said cumulative percentage point updating means; and means for deciding presence or absence of knocking based on a comparison between the knock intensity value and the knock decision level and controlling knocking control factors such as ignition timing and an air-to-fuel ratio based on a result of the decision.

2. A knock control apparatus for an internal combustion engine, comprising:
- means for detecting knocking occurring in an internal combustion engine and outputting an electric signal;
- means for detecting a knock intensity value from the output signal of said knock detecting means within a predetermined crank angle range;
- means for calculating a mean value of the knock intensity values;
- means for calculating a mean deviation between the knock intensity value and the mean value;
- means for calculating a cumulative percentage point of the distribution of the knock intensity values;
- mean value updating means including:
- means for calculating a first updated quantity for updating the mean value based on the knock intensity value and the cumulative percentage point; and
- means for setting a second updated quantity for updating the mean value, based on the mean deviation when the first updated quantity is larger than an absolute value of the mean deviation, while, based on the first updated quantity when the first updated quantity is smaller than the absolute value of the mean deviation means for calculating a knock decision level based on an updation result of said mean value updating means; and
- means for deciding presence or absence of knocking based on a comparison between the knock intensity value and the knock decision level and controlling knocking control factors such as ignition timing and an air-to-fuel ratio based on a result of the decision.

3. A knock control apparatus for an internal combustion engine according to claim 1, wherein said cumulative percentage point calculating means calculates a center value of the distribution of the knock intensity values.

4. A knock control apparatus for an internal combustion engine according to claim 2, wherein said cumulative percentage point calculating means calculates a center value of the distribution of the knock intensity values.

* * * * *